(12) United States Patent
Ito et al.

(10) Patent No.: US 6,720,085 B2
(45) Date of Patent: Apr. 13, 2004

(54) HEAT SHRINKABLE POLYESTER FILM

(75) Inventors: Katsuya Ito, Ohtsu (JP); Norimi Tabota, Inuyama (JP); Satoshi Hayakawa, Ohtsu (JP); Katsuhiro Nakayamada, Ohtsu (JP)

(73) Assignee: Toyo Boseki Kabushiki Kaisha (JP)

( * ) Notice: Subject to any disclaimer, the term of this patent is extended or adjusted under 35 U.S.C. 154(b) by 0 days.

(21) Appl. No.: 09/978,091

(22) Filed: Oct. 17, 2001

(65) Prior Publication Data

US 2002/0090502 A1 Jul. 11, 2002

(51) Int. Cl.$^7$ ................................................ B32B 27/36
(52) U.S. Cl. .................... 428/480; 428/316.6; 428/212; 428/218; 428/317.9; 428/36.5; 428/36.91; 427/336
(58) Field of Search ............................. 428/480, 316.6, 428/212, 218, 317.9, 36.5, 36.91, 34.9, 35.1, 57, 318.4, 318.6; 427/336; 521/82, 182

(56) References Cited

U.S. PATENT DOCUMENTS 4,963,418 A   10/1990   Isaka et al. ................ 428/34.9
5,422,175 A   6/1995    Ito et al. ................... 428/304.4

FOREIGN PATENT DOCUMENTS

| EP | 1-145 846 A2 | 10/2001 |
| JP | A-63-193822 | 8/1988 |
| JP | A-05-111960 | 5/1993 |
| JP | A-07-53756 | 2/1995 |

*Primary Examiner*—Samuel A. Acquah
*Assistant Examiner*—Melanie Bissett
(74) *Attorney, Agent, or Firm*—Kenyon & Kenyon

(57) ABSTRACT

The present invention relates to a heat shrinkable polyester film. The present invention also relates to a heat shrinkable polyester tube obtained from the heat shrinkable polyester film, a production method thereof, a label using this tube and a container wearing this label. The heat shrinkable polyester film of the present invention has suitable heat shrinkable properties, superior printing property and adhesion property with a solvent. When it is used for packaging (e.g., covering, bundling and the like), the film shows superior appearance and good mountability. Moreover, the heat shrinkable polyester film of the present invention has a small apparent specific gravity and is easily collected separately from a bottle when it is used as a label of a bottle (such as PET bottle).

19 Claims, No Drawings

HEAT SHRINKABLE POLYESTER FILM

FIELD OF THE INVENTION

The present invention relates to a heat shrinkable polyester film. The present invention also relates to a heat shrinkable polyester tube obtained using the heat shrinkable polyester film, a production method thereof and to a container wearing this heat shrinkable polyester film. The heat shrinkable polyester film of the present invention has, in addition to suitable heat shrinkable properties, superior printing property, adhesion property by the action of a solvent, superior appearance when used for packaging such as covering, bundling and the like, and mountability. Furthermore, the heat shrinkable polyester film of the present invention has a small apparent specific gravity, and can be collected separately from a bottle after use relatively easily after fitted to the bottle (such as PET bottle) as a label.

BACKGROUND ART

A heat shrinkable tube made of a heat shrinkable plastic film is used as a covering or a bundle of, for example, containers such as bottles (e.g., plastic bottles etc.), cans and the like, rods (e.g., pipe, rod, wood etc.), plates, boxes and the like. Particularly, a heat shrinkable tube is widely used for a broad range of purposes, such as indication, protection, bundling, improved commercial value and the like of the contents of containers, by covering a part of the containers (e.g., cap, shoulder, body etc.) or the whole surface thereof, for packaging the containers, rods, plate-like products (e.g., notebooks etc.), boxes and the like by adhesion (e.g., collective packaging, skin-packaging etc.) and the like, and the development of use relying on shrinkability and shrinking stress is expected.

For the above-mentioned purposes, materials of heat shrinkable films, such as polyvinyl chloride, polystyrene, polyethylene, rubber hydrochloride and the like, are used, which film is processed to give a tube to cover the aforementioned article to be packaged and shrunk or, plural articles are collectively packaged with a tube-like film and the film is shrunk by heat. However, the heat shrinkable film made from these materials has defects in that it has poor heat resistance and cannot maintain a film state, because it is melted or burst easily by a boil treatment or retort treatment at a high temperature.

While a heat shrinkable film is often used after printing, when the above-mentioned heat shrinkable film is printed, printing pinholes are produced due to defective transfer of ink, because fine irregularities are produced by the additives and gelled polymer in the film (fish eye). Even when printing proceeded successfully, there remains a problem in that the film shrinks (shrinkage at normal temperature) after printing, thus resulting in a different printing pitch.

In recent years, a heat shrinkable polyester film has been drawing much attention claiming that the above-mentioned defects in conventional heat shrinkable films can be dramatically improved.

However, the conventional heat shrinkable polyester film is associated with a problem in that it has a greater heat shrinkage rate than a heat shrinkable film made from the aforementioned polyvinyl chloride, polystyrene, polyethylene, rubber hydrochloride and the like. A greater heat shrinkage rate causes shrinkage spots in a film that markedly reduce the commercial value. For example, when a conventional heat shrinkable polyester film is used to produce a shrink label for bottles, the great shrinkage rate causes concentration of shrinkage spots on a bottle shoulder, where the shrinkage rate becomes the highest, inclusion of air bubbles in the seal part, that failed to escape smoothly from the inside, and other problems. These problems in the heat shrinkable polyester films in turn cause inconsistent density of print, degrade the appearance of the resulting products, and therefore, remain to be solved.

Moreover, heat shrinkable polyester films are frequently used as labels of plastic bottles, particularly PET bottle and the like. For a recycled use of the PET bottle, attached labels need to be separated from the PET bottle. One of the separation methods comprises pulverizing the PET bottle with the attached label, stirring the pulverized product as it is or in water, and separating the label from the starting material of the PET bottle based on different specific gravities. When this method is employed, since PET, which is the main starting material of the bottle, has a specific gravity of about 1.4, the specific gravity of the label needs to be adjusted to below 1.4. However, the specific gravity of conventional polyester for labels cannot be decreased with ease.

To solve the above-mentioned problems, an attempt was made to add a thermoplastic resin incompatible with polyester, such as polyolefin polymer, polystyrene and the like, to the polyester to achieve a suitable heat shrinkage rate, or stretch the resulting material according to a certain method to form voids in the polyester film, thereby to lower the apparent specific gravity after shrinkage. Such porous polyester film can be obtained according to the method described in, for example, JP-B-33063/1995, JP-A-111960/1993 and the like. Still, the aforesaid porous polyester films have the following problems.

(1) Due to insufficient brightness, the printing property is poor and due to the too high a total light transmittance, the content of the container can be seen through and the appearance of a label and a product is impaired upon actual use of the film as the label on the product.

(2) When voids in the film are increased to enhance brightness and decrease the total light transmittance, a number of voids are formed on the film surface as well, which in turn makes the surface roughness too high, printing property defective and appearance of the label poor.

(3) Because of the higher surface roughness, the surfaces of the splicing areas cannot be adhered to each other by the use of a solvent when processing a heat shrinkable film into a tube. Consequently, an adhesive and the like is required for the adhesion of the surfaces of the splicing areas, making the processing complicated. This method also makes the splicing areas easily damaged. As a result, the splicing areas do not permit superior heat shrinkage but cause whitening and embrittlement, and the appearance of a label becomes poor.

(4) The surface roughness of the print-and that of other surfaces are not balanced well, and the mountability and good appearance of product cannot be achieved at the same time.

(5) Because the apparent specific gravity is too high, separation and recovery based on different specific gravities after use as a label on a PET bottle etc. is difficult.

Therefore, there is a need for a heat shrinkable polyester film having suitable heat shrink property, superior printing property, permitting adhesion with a solvent, and superior appearance and mountability when used for packaging. In addition, a smaller apparent specific gravity of the polyester film is desired to be achieved.

SUMMARY OF THE INVENTION

According to the present invention, the following heat shrinkable polyester film is provided, which is superior in printing property, permits adhesion with a solvent, is superior in appearance and mountability, and which has a small apparent specific gravity.

The present invention provides the following:

(1) a heat shrinkable polyester film having a brightness of not less than 70, which permits adhesion with a solvent, (2) the heat shrinkable polyester film of the above-mentioned (1), comprising voids, (3) the heat shrinkable polyester film of the above-mentioned (2), wherein the voids are formed by forming a polyester comprising an incompatible thermoplastic resin into a film and stretching the film at least uniaxially, (4) the heat shrinkable polyester film of the above-mentioned (2), comprising a polyester layer having many fine voids (layer A) and a polyester layer (layer B) having a smaller porosity than layer A, which is formed at least on one surface of the layer A, (5) the heat shrinkable polyester film of the above-mentioned (4), wherein the layer A is a porous polyester layer having a porosity of 5–50 vol %, and the layer E is a porous polyester layer having a porosity of 0–20 vol %, (6) the heat shrinkable polyester film of the above-mentioned (5), which further comprises a polyester layer (layer C) having a porosity of 0–50 vol % formed on the other side of the layer A where the layer B is not formed, (7) the heat shrinkable polyester film of the above-mentioned (1), which has a center line mean surface roughness of at least one surface of not more than 0.5 $\mu$m, (8) the heat shrinkable polyester film of the above-mentioned (7), which has a total light transmittance of not more than 30%, and a percentage of heat shrinkage in hot air at 95° C. of 30–90% in either direction of the heat shrinkable polyester film, (9) the heat shrinkable polyester film of the above-mentioned (8), wherein the film has a heat shrinkage percentage of 0–10% in a direction perpendicular to said direction,

(10) the heat shrinkable polyester film of the above-mentioned (7), wherein the center line mean surface roughness (Ra1) of one surface is not more than 0.5 $\mu$m and the center line mean surface roughness (Ra2) of the opposite surface is greater than Ra1 by not less than 0.05 $\mu$m,

(11) the heat shrinkable polyester film of the above-mentioned (1), which further comprises organic or inorganic fine particles having a mean particle size of 0.001–5.0 $\mu$m as a lubricant in a proportion of 0.01–30 wt %,

(12) the heat shrinkable polyester film of the above-mentioned (4), wherein the layer A comprises organic or inorganic fine particles having a mean particle size of 0.001–5.0 $\mu$m as a lubricant in a proportion of 0.01–30 wt %,

(13) the heat shrinkable polyester film of the above-mentioned (1), which has an apparent specific gravity of less than 1.1,

(14) the heat shrinkable polyester film of the above-mentioned (1), which has an apparent specific gravity of less than 1.1 after heat shrinkage in at least one direction by 5–50%,

(15) the heat shrinkable polyester film of the above-mentioned (1), which further comprises at least one residue selected from a neopentylglycol residue and a cyclohexanedimethanol residue as a component of the polyester,

(16) the heat shrinkable polyester film of the above-mentioned (1), which has a film thickness of 10–100 $\mu$m,

(17) the heat shrinkable polyester film of the above-mentioned (4), wherein the layer A has a thickness ratio to the layer B of 1.5–30,

(18) the heat shrinkable polyester film of the above-mentioned (1), which comprises a print on at least one surface,

(19) a heat shrinkable polyester tube obtained by adhering the heat shrinkable polyester film of the above-mentioned (1) with a solvent,

(20) a container equipped with the heat shrinkable polyester film of the above-mentioned (1), and

(21) a method for producing a heat shrinkable polyester tube, which method comprises the steps of applying at least one solvent selected from solvents having a solubility parameter within the range of 8.0–13.8 to at least one splicing area of the heat shrinkable polyester film of the above-mentioned (1); splicing the heat shrinkable polyester film at splicing areas at a temperature of not more than 70° C.; and drying the spliced film to give the tube.

DETAILED DESCRIPTION OF THE INVENTION

As the polyester to be used for the heat shrinkable polyester film of the present invention, one or more kinds of polyester(s) or copolyester(s) (hereinafter to be referred collectively to as "polyester") can be used, which comprise one or more kinds of dicarboxylic acid component(s) selected from the group consisting of known dicarboxylic acids such as terephthalic acid, oxalic acid, malonic acid, succinic acid, adipic acid, azelaic acid, sebacic acid, phthalic acid, isophthalic acid, naphthalene dicarboxylic acid, diphenyl ether dicarboxylic acid and the like, and one or more kinds of diol component(s) selected from the group consisting of known diol components such as ethylene glycol, propylene glycol, trimethylene glycol, tetramethylene glycol, hexamethylene glycol, diethylene glycol, neopentyl glycol, polyalkylene glycol, 1,4-cyclohexanedimethanol and the like.

For the above-mentioned polyester, the dicarboxylic acid component is preferably terephthalic acid, isophthalic acid and the like from the aspects of price and shrinking property, and as the diol component, ethylene glycol, neopentyl glycol, cyclohexane dimethanol and the like are preferable from the aspect of shrinking property.

The above-mentioned polyester can contain, in addition to the aforementioned dicarboxylic acid and the diol component, other components, such as oxycarboxylic acid component (e.g., p-oxybenzoic acid, p-oxyethoxybenzoic acid etc.), polyol component (e.g., glycerine, pentaerythritol, trimethylol, trimethylenepropane etc.) and the like, as long as the obtained polyester chain can maintain the shape of a linear polymer.

The above-mentioned polyester may contain, at the terminal of the polyester chain, a residue of monofunctional compound, such as monocarboxylic acid (e.g., benzoic acid, benzoyl benzoate), metboxypolyalkylene glycol and the like.

The polyester to be used for the heat shrinkable polyester film of the present invention preferably contain many tine voids. Containing many fine voids here means containing voids to a porosity of 5–50 vol %, preferably 10–40 vol %. The fine voids here mean those within the range as expressed by an average pore size of 1–100 $\mu$m, preferably 2–50 $\mu$m. By the use of such porous polyester, the heat shrinkable polyester film of the present invention has a desired brightness. By containing voids, the film has a suitable apparent specific gravity.

The voids are formed in polyester by any known method, such as a method comprising extruding a polyester containing a foaming agent and the like in admixture and the like. In the present invention, a thermoplastic resin incompatible with a polyester is preferably mixed and the mixture is stretched at least in the uniaxial direction to form the voids.

As the thermoplastic resin incompatible with the above-mentioned polyester, any resin can be used, which is exemplified by, but not limited to, polystyrene resin, polyolefin resin (e.g., polypropylene, polymethylpentene etc.), polyacrylic resin, polycarbonate resin, polysulfone resin, cellulose resin and the like. Of these, particularly polystyrene resin and polyolefin resins, such as polymethylpentene, polypropylene and the like, are preferable, because voids can be formed easily.

The polystyrene resin refers to a thermoplastic resin containing a styrene monomer unit as a basic constituent. Examples thereof include styrene homopolymers such as atactic polystyrene, syndiotactic polystyrene, isotactic polystyrene and the like, modified polystyrene resin wherein other components are graft or block copolymerized with the homopolymer (e.g., high impact polystyrene resin, modified polyphenylene ether resin and the like), and a mixture with a thermoplastic resin (e.g., polyphenylene ether) compatible with these polystyrene resins.

The polymethylpentene resin is a polymer containing a monomer unit derived from 4-methylpentene-1 in a proportion of not less than 80 mol %, preferably not less than 90 mol %, and contains a monomer unit derived from ethylene, propylene, butene-1,3-methylbutene-1 etc., and the like, as a component other than 4-methylpentene-1.

The polypropylene resin includes, besides the propylene homopolymer such as isotactic polypropylene, syndiotactic polypropylene and the like, a modified polypropylene resin wherein the homopolymer is graft or block copolymerized with a component other than propylene.

To make the porosity fall within the range defined in the present invention, the above-mentioned thermoplastic resin is mixed in an amount of 1–30 wt %, preferably 5–25 wt %, of the above-mentioned polyester. This mixture is formed into a film by the method to be mentioned later and then stretched to give a porous polyester film.

The above-mentioned thermoplastic resin and polyester can be mixed by any method wherein, for example, a polyester chip and a thermoplastic resin chip are mixed and melted and kneaded in an extruder and extruded. Alternatively, the both chips are kneaded in a mix-kneader and then melt-extruded from an extruder The mixing may include adding the above-mentioned thermoplastic resin during polymerization of the polyester, stir-dispersing the chips and melt extruding the chips. The unstretched polyester film thus obtained is stretched at least uniaxially by the method to be mentioned later to give a porous polyester film.

According to the present invention, organic or inorganic fine particles are preferably added as a lubricant to the above-mentioned polyester to improve slip property and masking property when the heat shrinkable polyester film is made into a label. Examples of the fine particles as a lubricant include inorganic fine particles, such as kaolin, clay, calcium carbonate, silicone oxide, aluminum oxide, titanium oxide, calcium phosphate, lithium fluoride and the like, metal compound catalyst for polyester synthesis such as alkali metal compound, alkaline earth metal compound and the like, organic fine particles, such as calcium terephthalate, organic compound having high melting point, which is insoluble during melt-forming of polyester resin (e.g., polyacrylic resin, polystyrene resin etc.), crosslinked polymer (e.g., melamine resin etc.) and the like.

The above-mentioned organic or inorganic fine particles as a lubricant preferably have a mean particle size of 0.001–5.0 μm. The mean particle size of the fine particles of less than 0.001 μm results in a failure to achieve the slip property of a label and no contribution of a label to the masking property, and a mean particle size exceeding 5.0 μm causes falling off of the particles form the film surface.

The above-mentioned organic or inorganic fine particles are preferably contained as a lubricant in the above-mentioned polyester in a proportion of 0.01–30 wt %, preferably 0.5–10 wt %. A proportion of the fine particles as a lubricant of less than 1 wt % results in a failure to achieve the slip property of a label and no contribution of a label to the masking property, and a proportion of more than 30 wt % causes falling off of the particles form the film surface.

The above-mentioned polyester has an intrinsic viscosity of 0.50–1.0 dl/g, preferably 0.60–0.90 dl/g, more preferably 0.65–0.85 dl/g. When the intrinsic viscosity of the polyester is less than 0.50, the crystallinity becomes too high, and sufficient shrinking rate upon processing into a film cannot be achieved. When it is more than 1.0 dl/g, extrusion from a T-die becomes unpreferably difficult.

In the present invention, the polyester may contain, where necessary, additives other than the above-mentioned lubricant, such as stabilizer, coloring agent, antioxidant, defoaming agent and the like.

The heat shrinkable polyester film of the present invention may have a structure consisting of 2 or more layers, wherein a different layer is formed on at least one surface of the aforementioned porous polyester layer.

Preferably the present invention is a heat shrinkable polyester film having a two-layer structure consisting of the aforementioned porous polyester layer A and a layer B having a porosity smaller than that of the layer A, which is formed on at least one surface of the layer A.

The layer B can be produced from the same material as the material mentioned above with regard to the layer A.

When the above-mentioned layer B is formed, the layer B has a porosity that should be smaller than the porosity of the layer A. Specifically, the porosity of the layer B is 0–20%, preferably 0–10%.

To make the heat shrinkable polyester film of the present invention have the above-mentioned two-layer structure, it is preferable that the materials of layer A and layer B be respectively cast in different extruders, melted, adhered before a T-die or in the die in a melting state, adhered to and cooled on a chill roll and stretched by the method to be mentioned below. By setting the content of the thermoplastic resin in the starting material of layer B to 0–10%, the layer B after stretching has a porosity within the above-mentioned range.

When a two-layer structure consisting of layer A and layer B is employed, the thickness ratio of layer A to layer B is 1.5–30, preferably 4–10. When the thickness ratio is less so than 1.5, the good appearance of the print and a low apparent specific gravity cannot be easily achieved.

A heat shrinkable polyester film having such two-layer structure shows a small surface roughness of layer B and has suitable brightness and total light transmittance afforded by layer A. Therefore, the film is superior in printing property and appearance of printed film. Such film has a smaller surface roughness of layer B, and adhesion with a solvent on the layer B side becomes possible. As a result, processing into a tube shape becomes easy and the tube has a superior appearance at the splicing area. Moreover, such film, wherein the layer B acts as a reinforcing element, is pliant and hard to break even when a multitude of voids are contained in the layer A, and shows superior heat shrinkable properties and mountability.

The heat shrinkable polyester film of the present invention may have a three-layer structure, wherein the layer A of the above-mentioned two-layer structure further has a layer C on the surface opposite from the layer B, thus forming a B/A/C structure.

The layer C can be produced from the same material as the material mentioned above with regard to the layer A.

The layer C preferably contains fine particle as a lubricants as a lubricant. Examples of the fine particles as a lubricant are the organic or inorganic fine particles recited above for the layer A. The fine particles are preferably added to the polyester of layer C as a lubricant in an amount of 0.1–50 wt % to improve slip property between a heat shrinkable film as a label and a bottle and the like, and to improve masking property.

The heat shrinkable polyester film of the present invention preferably has a thickness of 10–100 μm, for any constitution mentioned above. When the film thickness exceeds 100 μm, shrinking tends to become inconsistent. When the film thickness is less than 10 μm, a desired brightness or total light transmittance cannot be afforded.

The heat shrinkable polyester film of the present invention has a brightness of not less than 70, preferably not less than 75, more preferably not less than 80. When the brightness is less than 70, the contents may be seen through or the printing on the label surface becomes difficult to see, when it is used as a label of a bottle and the like, thus strikingly impairing the appearance of products. The brightness can be measured by, for example, a method defined in JIS-L1015-1981-B.

The heat shrinkable polyester film of the present invention has a total light transmittance of not more than 30%, preferably not more than 25%, more preferably not more than 20%, still more preferably not more than 15%. When the total light transmittance is more than 30%, the contents can be seen through when used as a label of a bottle and the like, and the print on the label surface becomes difficult to see, thereby unpreferably degrading the appearance of products. The total light transmittance can be measured by a method defined in, for example, JIS-K7105-1981.

The heat shrinkable polyester film of the present invention has a heat shrinkage percentage in one direction in hot air at 95° C. of 30–90%, preferably 40–90%, more preferably 50–90%.

When the heat shrinkage percentage in one direction of this film is 30–90% and that in the direction perpendicular to the direction mentioned above is 0–10%, preferably 0–5, more preferably 0–3%, the waviness of the film upon heat shrinkage can be effectively suppressed and the film has superior appearance. When the heat shrinkage percentage of this film in the perpendicular direction exceeds 10%, the film becomes undulate when used as a label on deformed packaged articles, making the appearance inferior. When the heat shrinkage percentages of the above-mentioned film in the both directions are less than 30%, and the film is set on a surface of deformed packaged articles, the necessary shrinkage in each part of the packaged articles is difficult to achieve.

The above-mentioned heat shrinkage percentage can be achieved by stretching a polyester film obtained by forming according to an optional method such as extrusion method, calendar method and the like. Specifically, an unstretched polyester film is stretched 3.0–7.0 times, preferably 4.4–6.2 times, in the main shrinkage direction, and then stretched 1.0–2.0 times, preferably 1.1–1.8 times, in the direction perpendicular to the main direction. By stretching in the main shrinkage direction at the above-mentioned draw ratio, the heat shrinkage percentage of the film can be achieved. By stretching the film in the main shrinkage direction and the perpendicular direction at the above-mentioned draw ratio, the impact resistance and tear resistance of the film stretched in the main shrinkage direction can be improved. When a film is stretched more than 2.0 times in the direction perpendicular to the main shrinkage direction, the heat shrinkage percentages of the both directions differ too greatly from each other upon heat shrinkage of the film, which in turn leads to waviness. Either the stretching in the main shrinkage direction or that in the direction perpendicular thereto may come first.

The method for the above-mentioned stretching is subject to no particular limitation, and a roll stretching method, a long interval stretching method, a tenter stretching method and the like can be applied. The shape of the film to be stretched may be flat, tube or any other.

The unstretched polyester film can be stretched by sequential biaxial stretching, simultaneous biaxial stretching, uniaxial stretching, a combination of these and the like to give a heat shrinkable polyester film.

In the above-mentioned stretching, heat setting can be applied according to the purpose. For example, to prevent dimensional changes of a heat shrinkage film under high temperature during the summer season, it is advisable to pass a stretched film through a heating zone at 30–150° C. for about 1–30 seconds. The film may be stretched by 70% at maximum either before or after, or before and after, the treatment. In this case, the film is preferably stretched in the main shrinkage direction but relaxed in the direction perpendicular to the main shrinkage direction, without stretching in this direction.

To improve the heat shrinkability of the heat shrinkable polyester film of the present invention, the above-mentioned stretch ratio is adjusted and the film is preferably preheated at a temperature (e.g., about Tg+80° C.) of not less than the mean glass transition temperature (Tg) of polyester and stretched. By the "mean glass transition temperature" is meant an average Tg of polyester, thermoplastic resin and the like, constituting the film. Particularly, the temperature of the above-mentioned pre-heating for stretching in the main shrinkage direction is extremely important in suppressing the heat shrinkage percentage in the direction perpendicular to the main shrinkage direction. To be specific, the temperature of the pre-heating for stretching in the main shrinkage direction is set within the above-mentioned range, thereby to set the heat shrinkage percentage in the perpendicular direction to a minimum value within the temperature range or 80±25° C. (i.e., 0). After the stretching, the film is maintained in an extended or stretched state and cooled while applying a stress. Thereafter the film is successively cooled to make the heat shrink property fine and stable.

The apparent specific gravity of the heat shrinkable polyester film of the present invention is preferably less than 1.1, more preferably less than 1.0, most preferably less than 0.95. By setting the apparent specific gravity to fall within this range, separation and recovery based on different specific gravity from PET becomes easy, after use of the film as a label of a PET bottle. When the apparent specific gravity is not less than 1.0, a mixture of the pulverized film used for a label and PET cannot be easily separated in water. When the apparent specific gravity is not less than 1.1, separation and recovery of a mixture of the film used for a label and PET, based on different specific gravity, becomes difficult.

The heat shrinkable polyester film of the present invention preferably has a specific gravity of less than 1.1 after 5–50% heat shrinkage at least in one direction. In this case, the specific gravity varies depending on the degree of shrinkage, but it needs only to have a specific gravity of less than 1.1 either after use as a label of a bottle and the like, or after complete shrinkage. With the specific gravity of less than 1.1 after heat shrinkage, the separation and recovery of a mixture of the film of the present invention after use for a label of a bottle and the like becomes preferably easy.

The heat shrinkable polyester film of the present invention has a center lime average surface roughness of at least one surface of not more than 0.5 sun, preferably not more than 0.2 $\mu$m, more preferably not more than 0.1 $\mu$m. When the center line average surface roughness of at least one surface exceeds 0.5 $\mu$m, the appearance of the print becomes poor. It is more preferable that the center line average surface roughness of at least one surface (Ra1) be set to fall in this range, and the center line average surface roughness (Ra2) of the opposite surface from this surface be greater than Ra1 by not less than 0.05 $\mu$m, preferably not less than 0.1 $\mu$m, more preferably not less than 0.2 $\mu$m. When the difference between Ra2 and Ra1 is less than 0.05, the slipperiness between the film surface in contact with the packaged articles and the surface of the packaged articles becomes inferior during heat shrinkage, as a result of which the appearance of the label and mountability become poor.

The heat shrinkable polyester film of the present invention is characterized by the presence of print on at least one surface thereof. The print may be present on the opposite surface or both surfaces depending on the purpose and the like. The printing is done by any known method, which is exemplified by gravure printing, offset printing, screen printing and the like.

The heat shrinkable polyester film of the present invention has a cushioning rate of not less than. 10%, preferably not less than 20%. When the cushioning rate is not less than 10%, it prevents breakage of a bottle and the like when it is used as a label thereon. In contrast, when the cushioning rate is less than 10%, breakage of a bottle and the like is difficult to prevent.

The heat shrinkable polyester film of the present invention is characterized by successful adhesion by the action of a solvent. For example, the splicing area of the film is adhered with a solvent (inclusive of swelling agent) and processed into a tube to give a heat shrinkable polyester tube.

In the present specification, by the "possible adhesion with a solvent" is meant that the strength (peeling strength) necessary for peeling a film press-adhered with a rubber roller at 50 m/min after applying a solvent (inclusive of swelling agent) to be mentioned below in an amount of 3 g/m to an overlap width is not less than 200 mN/15 mm.

The unit "mN/15 mm" of the peeling strength used in the present specification is the conversion of the force necessary for peeling of films having various widths to the value per 15 mm width. This does not mean that the width of the film should be 15 mm alone.

In the present specification, by the "splicing area" is meant the area that contributes to the adhesion when processing the heat shrinkable polyester film into a tube, and generally means an end of a film. The adhesion width of the above-mentioned splicing area may be from a narrowest possible width to not less than 50 mm, which width is determined as appropriate according to the kind of containers, and is generally 1–5 mm. The shape of the splicing area may be a single line or plural lines.

The adhesion of the splicing area with a solvent results in scarce damage done on the splicing area of the film during processing into a tube, without impairing the property of polyester. Therefore, the heat shrinkable polyester tube of the present invention is extremely beneficial because it not only maintains the superior heat shrinkage property, printing property, appearance, low apparent specific gravity, prevention of breakage and the like of the heat shrinkable polyester, but also prevents decreased orientation degree of the splicing area during heat shrinkage, unpreferable phenomena during mounting, such as whitening and embrittlement of the splicing area due to the heat treatment.

The above-mentioned heat shrinkable polyester tube can be obtained by the steps of applying at least one solvent selected from the solvents (inclusive of swelling agent) having a solubility parameter within the range of 8.0–13.8 to at least one surface of the splicing area of the heat shrinkable polyester film; adhering the heat shrinkable polyester film at a temperature of not more than 70° C.; and drying the adhered film to give a heat shrinkable polyester tube.

The "solubility parameter" of a solvent is an index showing the solubility of a substance, wherein the smaller the difference in the solubility parameter between two components, the higher the compatibility of the two components. As the solubility parameter of a solvent, for example, the values shown in "Solvent Handbook" (The Adhesion Society of Japan ed., The Nikkan Kogyo Shimbun, Ltd.) and the like can be used. In the present invention, the solubility parameter of a solvent (inclusive of swelling agent) used for the adhesion of heat shrinkable polyester is set to 8.0–13.8, whereby the aforementioned suitable adhesion can be achieved. When the solubility parameter is less than 8.0, the surface of the film splicing area does not dissolve (or swell) by the action of the solvent (inclusive of swelling agent) and the adhesion becomes insufficient. When it is more than 13.8, the surface of the film splicing area does not dissolve (or swell) by the action of the solvent (inclusive of swelling agent) and the adhesion becomes insufficient.

Such solvents (inclusive of swelling agent) include, for example, aromatic hydrocarbon such as benzene, toluene, xylene, trimnethylbenzene, etc.; phenols such as phenol, m-cresol, etc.; aromatic alcohols such as benzyl alcohol, etch; nitro aromatic hydrocarbons such as nitrobenzene, etc.; aliphatic nitriles such as acetonitrile, etc.; aliphatic amines such as n-butylamine, N,N-dimethylformamide, etc.; heterocyclic amines such as pyridine, morphorine, etc.; aliphatic ketones such as acetone, methyl ethyl ketone, methyl isobutyl ketone, etc.; cycloalkanes such as methylcyclohexane, etc.; cyclic ethers such as 1,3dioxolane, tetrahydrofuran, dioxane, etc.; aliphatic esters such as ethyl acetate, n-butyl acetate etc.; organic acids such as formic acid, acetic acid, fluoroacetic acid, etc; inorganic acids such as sulfuric acid, nitric acid, etc.; sulfur derivatives such as carbon disulfide, etc. These solvents may be used in combination of two or more kinds, as trim long as the above-mentioned range of solubility parameter is maintained. Preferable solvents include 1,3-dioxolane (solubility parameter: 10.5), methyl ethyl ketone (solubility parameter: 9.3), a 9:1 (weight ratio) solution of 1,3-dioxolane and tetrahydrofuran (solubility parameter: 10.4), and the like.

The temperature of the above-mentioned drying is appropriately determined depending on the boiling point of the solvent and the like. It is generally not more than 200° C., preferably not more than 150° C.

Examples of the articles to be packaged, on which the heat shrinkable polyester film of the present invention can be attached as a label, include containers [e.g., bottles (plastic bottles such as PET bottle etc., and the like), cans, trays etc.], rods (pipes, rods, woods etc.) and the like. Preferably, the packaged articles are PET bottles containing polyethylene terephthalate as a main starting material. The PET bottles having the film of the present invention as a label are beneficial in that the label and the PET bottle can be separated easily based on different specific gravities after use, because the apparent specific gravity of the film is small, as mentioned above. In addition, this film characteristically does not easily color the starting material of PET bottles collected for recycled use even if a small amount thereof is mixed in. Therefore, PET bottles having the film of the present invention as a label are extremely easily recycled.

EXAMPLES

The present invention is explained in detail by referring to examples. The present invention is not limited by these examples in any way, and can be modified as long as it does not deviate from the technical idea of the present invention. In the following, the "part" means "part by weight" and "%" means "wt %".

The measurement methods used in the present invention are explained in the following.

1. Measurement of Heat Shrinkage Percentage

Two lines (interval 200 mm) were marked on a 15 mm wide sample film. The sample film was heated with hot air (wind speed: 10 m/sec) at 95° C. for 1 min. After heating, the distance between the lines on the film was measured and the heat shrinkage percentage (%) was calculated by the following formula, heat shrinkage percentage (%)={(distance between the lines before heating)−(distance between the lines after heating}/(distance between the lines before heating)×100

2. Measurement of Center Line Mean Surface Roughness

According to JIS-B0601-1994, SURFCOM 300A type surface roughness meter (manufactured by Tokyo Seimitsu Co., Ltd.) was used under the conditions of stylus diameter: 2 μm, stylus pressure: 30 mg, pressure of measurement: 30 mg, cut-off: 0.8 mg to measure the center line mean surface roughness (Ra1, Ra2) of the both surfaces of the heat shrinkable polyester film.

3. Measurement of Brightness

The brightness was measured by the JIS-L1015-1981-B method using Z-1001DP (manufactured by Nippon Denshoku Industries Co, Ltd.).

4. Measurement of Total Light Transmittance

The total light transmittance was measured by the JIS-7105-1981 method using NDH-1001DP (manufactured by Nippon Denshoku Industries Co., Ltd.).

5. Measurement of Apparent Specific Gravity of the Films

The films before heat shrinkage and after heat shrinkage under the conditions of the above-mentioned 1. Were cut into 10×10 mm size pieces to give samples. Water, ethanol and potassium chloride or potassium bromide were appropriately combined to prepare solutions having various specific gravities between 0.75 g/m² and 1.4 g/m². The films cut out were placed in these solutions and the point that reached the balance was taken as the apparent specific gravity of the sample.

6. Evaluation of Film Adhesion Property via Solvent

Solvent A: methyl ethyl ketone (solubility parameter: 9.3) and solvent B: 9:1 (weight ratio) mixed solvent of 1,3-dioxolane and tetrahydrofuran were applied to the splicing area of a film, and, before the film surface gets dry, the splicing areas were immediately layered and pressed with a rubber roller for adhesion, thereby to process the film into a tube to give a heat shrinkable polyester tube. The processing rate was 50 m/min.

The splicing area of the tube was visually observed and evaluated by rating clean appearance with ◯, poor appearance and/or adhesion failure with ◯.

For detailed evaluation of the adhesion property via solvent of the splicing area, the above-mentioned polyester tube was cut in the direction orthogonal with the machine direction (longitudinal direction of the tube) during processing in the width of 15 mm, thereby to provide a sample (width 15 mm, length 120 mm) containing a splicing area. This sample was stretched with a tensile testing machine (manufactured by TOYO BALDWIN Co., LTD., STM-T) toward the both ends of the longitudinal direction of the sample, and the stress necessary for peeling the splicing area (peeling strength) was measured.

7. Evaluation of Shrinkage Finish

A printed heat shrinkable polyester film was cut and processed by the method of 6. to give a heat shrinkable polyester tube. This tube was set to cover a PET bottle (500 ml) and subjected to a hot air treatment (wind speed: 10 m/sec) through a heat shrink tunnel at 95° C. to give a PET bottle wearing a label. The finish state was visually observed and ranked in 5 levels of 5: most superior finish, 4: fine finish, 3: slight shrinkage non-uniformity (in 2 or less sites), 2: shrinkage non-uniform (3–6 sites) and 1: many sites of shrinkage non-uniformity (not less than 6 sites), wherein rank 4 or above was a pass.

8. Evaluation of Printing Non-uniformity of Film

A heat shrinkable polyester film was gravure printed, and in the same manner as in the above-mentioned 7., and subjected to hot air treatment (wind speed: 10 m/sec) through a heat shrink tunnel at 95° C. to allow shrinkage. The printing non-uniformity of the surface of film after heat shrinkage was visually observed and evaluated by rating ◯: absence of printing non-uniformity and ◯: presence of printing non-uniformity.

9. Evaluation of Porosity of Film

The porosity of each layer of heat shrinkable polyester film was determined as follows. The section of a film was cut out in parallel with the main shrinkage direction, magnified 1000-fold with a scanning electron microscope (Hitachi Ltd., S-510) and photographed. From this photograph, the ratio of the sectional area of voids to the sectional area of the film, which value was taken as a porosity (vol %).

10. Evaluation of Masking Property of Label

The PET bottle (500 ml) having a label obtained in the above-mentioned 7. was filled with an orange juice. The appearance of the label was visually observed and when the orange juice therein was not seen or difficult to see, the label was evaluated as fine masking property (◯), and when it is seen through, defective masking property (◯).

The polyester used in the following Examples had the following composition.

(Polyester I) terephthalic acid/ethyleneglycol/neopentyl glycol=100/60/40 (molar ratio)

(Polyester II) terephthalic acid/ethylene glycol/1,4-cyclohexanedimethanol=100/60/40 (molar ratio)

Example 1

Starting material of layer A;
  polyethyleneterephthalate resin (intrinsic viscosity 0.75 dl/g, 35 wt %);
  polyester I (45 wt %);
  crystalline polypropylene resin (FO-50F, manufactured by Grand
    Polymer Company Ltd., 10 wt); and
  titanium dioxide (TA-300, manufactured by Fuji Titanium Inc., 10 wt %)
Starting material of layer B:
  polyethylene terephthalate resin (intrinsic viscosity 0.75 dl/g, 40 wt %); and polyester II (60 wt %)

The above-mentioned two kinds of starting materials were cast in different twin-screw extruders, mixed, melted, joined in a feed block, melt extruded from a T-die at 285° C. and statically adhered to a cool revolving roll to give a 180 μm thick (layer B/layer A=15 μm/165 μm) unstretched film. The unstretched film was stretched 1.2 times in a direction perpendicular to the main shrinkage direction in a roll stretch machine at 110° C., and 5.0 times in the main shrinkage direction in a tenter stretch machine at 70° C., which was followed by cooling while stretching the film by about 1% in the main shrinkage direction at 70° C. to give a heat shrinkable polyester film of the present invention (thickness: 40 μm).

The layer B of this film was gravure printed. Then a 9:1 (weight ratio) mixed solvent of 1,3-dioxolane and tetrahydrofuran was applied to the splicing areas of this film and the splicing areas were superimposed before the film surface gets dry and adhered to give a heat shrinkable polyester tube. The processing rate was 50 m/min.

This heat shrinkable polyester tube was set on a PET bottle (500 ml) and subjected to a hot air treatment (wind speed: 10 m/sec) through a heat shrink tunnel at 95° C. to allow adhesion to the PET bottle.

Example 2

In the same manner as in Example 1 except that the starting material of layer A was changed to polyethylene terephthalate resin (intrinsic viscosity 0.75 dl/g, 30 wt %); polyester II (40 wt %); and crystalline polypropylene resin (FO-50F, manufactured by Grand Polymer Company Ltd., 20 wt %), a heat shrinkable polyester film of the present invention (thickness: 40 μm) was obtained.

In the same manner as in Example 1, a heat shrinkable polyester tube was obtained from the above-mentioned heat shrinkable polyester film. In the same manner as in Example 1, moreover, the heat shrinkable polyester tube was adhered to the PET bottle.

Example 3

In the same manner as in Example 1 except that the starting material of layer A was changed to polyethylene terephthalate resin (intrinsic viscosity 0.75 dl/g, 40 wt %); polyester II (50 wt %); and titanium dioxide (TA-300, manufactured by Fuji Titanium Inc., 10 wt %), and the starting material of layer B was changed to polyethylene terephthalate resin (intrinsic viscosity 0.75 dl/g, 40 wt %); and polyester II (60 wt %), a heat shrinkable polyester film of the present invention was obtained.

In the same manner as in Example 1, a heat shrinkable polyester tube was obtained from the above-mentioned heat shrinkable polyester film. In the same manner as In Example 1, moreover, the heat shrinkable polyester tube was adhered to the PET bottle.

Comparative Example 1

In the same manner as in Example 1 except that the starting material of layer A was changed to polyethylene terephthalate resin (intrinsic viscosity 0.75 dl/g, 40 wt %); and polyester I (60 wt,%), a polyester film of Comparative Example 1 was obtained.

In the same manner as in Example 1, a polyester tube was obtained from the above-mentioned polyester film. In the same manner as in Example 1, moreover, the polyester tube was adhered to the PET bottle.

Comparative Example 2

In the same manner as in Example 1 except that the starting material of the layer A was changed to crystalline polypropylene resin (FO-50F, manufactured by Grand Polymer Company Ltd., 90 wt %) and titanium dioxide (TA-300, manufactured by Fuji Titanium Inc., 10 wt %), and layer B was not used, a film of Comparative Example 2 was obtained.

In the same manner as in Example 1, a tube was obtained from the above-mentioned film. In the same manner as in Example 1, moreover, the tube was adhered to the PET bottle.

The properties of the films obtained in the Examples and Comparative Examples are listed in the Table 1 below.

TABLE 1

| Measurement | Ex. 1 | Ex. 2 | Ex. 3 | Com. Ex. | Com. Ex. 2 |
|---|---|---|---|---|---|
| 1. heat shrinkage percentage (%) (main shrinkage direction/ orthogonal direction) | 55/1 | 57/2 | 54/1 | 50/2 | 3/2 |
| 2. center line mean surface roughness (Ra2/Ra1) | 0.35/0.10 | 0.40/0.11 | 0.15/0.09 | 0.04/0.05 | 0.30/0.32 |
| 3. brightness | 81 | 85 | 71 | 12 | 74 |
| 4. total light transmittance (%) | 20 | 14 | 25 | 81 | 21 |
| 5. apparent specific gravity (−) (before/after shrinkage) | 1.10/1.15 | 0.90/0.96 | 1.35/1.36 | 1.36/1.36 | 0.95/1.02 |
| 6. adhesion property by solvent (visual) | ◯ | ◯ | ◯ | ◯ | X |
| 7. adhesion property by solvent (peeling strength, mN/15 mm) | 530 | 420 | 610 | 590 | unmeasureable (adhesion unavailable) |
| 8. shrink finish | 5 | 5 | 5 | 5 | 1 |
| 9. printing inconsistency | ◯ | ◯ | ◯ | ◯ | X |
| 10. porosity (vol %) (layer A/layer B) | 13/0 | 33/0 | 1/0 | 0/0 | 30/24 |
| 11. masking property | ◯ | ◯ | ◯ | X | ◯ |

The heat shrinkable polyester films of Examples 1, 2 and 3 had superior appearance. The PET bottles having the films of Examples 1, 2 and 3 as labels were superior in both appearance of the label and mountability. In contrast, none of the films of Comparative Examples 1 and 2 satisfied all properties of the present invention.

As mentioned above, the heat shrinkable polyester film of the present invention has suitable heat shrinkable properties, superior printing property and adhesion property via a solvent. When it is used for packaging (e.g., covering, bundling and the like), the film shows superior appearance and good mountability. Moreover, the heat shrinkable polyester film of the present invention has a small apparent specific gravity and is easily collected separately from a bottle when it is used as a label of the bottle (such as PET bottle).

Consequently, the heat shrinkable polyester film of the present invention is superior and highly advantageous as a packaging material that can be used in a wide variety of fields.

What is claimed is:

1. A heat shrinkable polyester film comprising a first polyester layer having voids (layer A) and a polyester layer (layer B) having a smaller porosity than layer A, which is formed at least on one surface of layer A, wherein the film has a brightness of not less than 70, which permits adhesion with a solvent, and wherein the film has a percentage of heat shrinkage in hot air at 95° C. of 30–90% in either direction of the heat shrinkable polyester film.

2. The heat shrinkable polyester file of claim 1, wherein the voids are formed by forming a polyester comprising an incompatible thermoplastic resin into a film and stretching the film at least uniaxially.

3. The heat shrinkable polyester film of claim 1, wherein the layer A is a porous polyester layer having a porosity of 5–50 vol %, and the layer B is a porous polyester layer having a porosity of 0–20 vol %.

4. The heat shrinkable polyester film of claim 3, which further comprises a polyester layer (layer C) having a porosity of 0–50 vol % formed on the other side of the layer A where the layer B is not formed.

5. The heat shrinkable polyester film of claim 1, which has a center line mean surface roughness of at least one surface of not more than 0.5 μm.

6. The heat shrinkable polyester film of claim 1, which has a total light transmittance of not more than 30%.

7. The heat shrinkable polyester film of claim 1, wherein the film has a heat shrinkage percentage of 0–10% in a direction perpendicular to said direction.

8. The heat shrinkable polyester film of claim 4, wherein the center line mean surface roughness (Ra1) of one surface is not more than 0.5 μm and the center line mean surface roughness (Ra2) of the opposite surface is greater than Ra1 by not less than 0.05 μm.

9. The heat shrinkable polyester film of claim 1, which further comprises organic or inorganic fine particles having a mean particle size of 0.001–5.0 μm as a lubricant in a proportion of 0.01–30 wt %.

10. The heat shrinkable polyester film of claim 1, wherein the layer A comprises organic or inorganic fine particle having a mean particle size of 0.001–5.0 μm as a lubricant in a proportion of 0.01–30 wt %.

11. The heat shrinkable polyester film of claim 1, which has an apparent specific gravity of less than 1.1.

12. The heat shrinkable polyester film of claim 1, which has an apparent specific gravity of less than 1.1 after heat shrinkage in at least one direction by 5–50%.

13. The heat shrinkable polyester film of claim 1, which further comprises at least one residue selected from a neopentylglycol residue and a cyclohexanedimenthanol residue as a component of the polyester.

14. The heat shrinkable polyester film of claim 1, which has a film thickness of 10–100 μm.

15. The heat shrinkable polyester film of claim 1, wherein the layer A has a thickness ratio to the layer B of 1.5–30.

16. The heat shrinkable polyester film of claim 1, which comprises a print on at least one surface.

17. A heat shrinkable polyester tube obtained by adhering the heat shrinkable polyester film of claim 1 with a solvent.

18. A container equipped with the heat shrinkable polyester film of claim 1.

19. A method for producing a heat shrinkable polyester tube, which method comprises the steps of (a) applying at least one solvent selected from solvents having a solubility parameter within the range of 8.0–13.8 to at least one splicing area of the heat shrinkable polyester film of claim 1;

(b) splicing the heat shrinkable polyester film at splicing areas at a temperature of not more than 70° C.; and (c) drying the spliced film to give the tube.

* * * * *

UNITED STATES PATENT AND TRADEMARK OFFICE
CERTIFICATE OF CORRECTION

PATENT NO. : 6,720,085 B2  Page 1 of 1
DATED : April 13, 2004
INVENTOR(S) : Ito et al.

It is certified that error appears in the above-identified patent and that said Letters Patent is hereby corrected as shown below:

Column 11,
Line 32, change "heating)" to -- heating)] --.

Column 15,
Line 19, change "file" to -- film --

Signed and Sealed this

Thirtieth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,720,085 B2
DATED : April 13, 2004
INVENTOR(S) : Ito et al.

Page 1 of 1

It is certified that error appears in the above-identified patent and that said Letters Patent is hereby corrected as shown below:

Column 11,
Line 32, change "heating))" to -- heating)] --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,720,085 B2
DATED         : April 13, 2004
INVENTOR(S)   : Ito et al.

It is certified that error appears in the above-identified patent and that said Letters Patent is hereby corrected as shown below:

Column 1,
Line 58, change "improved" to -- corrected --.

Column 2,
Line 33, delete "a".
Line 51, change "print-and" to -- print and --.

Column 6,
Line 11, change "form" to -- from --.
Line 52, delete "so".

Column 10,
Line 40, change "hydrocarbon" to -- hydrocarbons --.
Line 49, change "1,3dioxolane" to -- 1,3-dioxolane --.
Line 54, delete "trim".

Column 11,
Line 32, change "heating)-(distance between the lines after heating)" to
-- heating)-(distance between the lines after heating)) --.
Line 52, change "Were" to -- were --.

Column 12,
Lines 2-3, (close up line space).
Lines 3, 33 and 48, change "O" to -- X --.
Lines 31-32, (close up line space).
Line 41, change ", which value was taken as a porosity" to -- was a value taken as porosity --.
Lines 47-48, (close up line space).
Line 51, change "ethyleneglycol" to -- ethylene glycol --.
Lines 61-62, (no line break).
Line 62, change "10 wt)" to -- 10 wt %) --.

UNITED STATES PATENT AND TRADEMARK OFFICE
CERTIFICATE OF CORRECTION

PATENT NO. : 6,720,085 B2
DATED : April 13, 2004
INVENTOR(S) : Ito et al.

It is certified that error appears in the above-identified patent and that said Letters Patent is hereby corrected as shown below:

Column 14,
Line 6, change "In" to -- in --.
Line 14, change "wt,%" to -- wt % --.

Signed and Sealed this

Eleventh Day of October, 2005

JON W. DUDAS
*Director of the United States Patent and Trademark Office*